(12) United States Patent
Petzold et al.

(10) Patent No.: US 7,012,540 B2
(45) Date of Patent: Mar. 14, 2006

(54) MOBILE WORKING MACHINE PROVIDED WITH STABILITY MONITORING

(75) Inventors: Wolf-Michael Petzold, Aichwald (DE); Stephan Gelies, Magdeburg (DE); Dieter Alwes, Aichtal (DE)

(73) Assignee: Putzmeister Aktiengesellschaft, (DE)

( * ) Notice: Subject to any disclaimer, the term of this patent is extended or adjusted under 35 U.S.C. 154(b) by 118 days.

(21) Appl. No.: 10/469,408

(22) PCT Filed: Feb. 27, 2002

(86) PCT No.: PCT/EP02/02053

§ 371 (c)(1),
(2), (4) Date: Aug. 28, 2003

(87) PCT Pub. No.: WO02/075076

PCT Pub. Date: Sep. 26, 2002

(65) Prior Publication Data

US 2004/0119597 A1 Jun. 24, 2004

(30) Foreign Application Priority Data

Mar. 2, 2001 (DE) ................................ 101 10 176

(51) Int. Cl.
*G08B 21/00* (2006.01)
(52) U.S. Cl. ...................... 340/679; 340/665; 340/685; 340/686.1; 340/440; 701/50; 701/116; 701/124
(58) Field of Classification Search ........ 340/665–667, 340/679, 685, 682, 686.1, 689, 686.5
See application file for complete search history.

(56) References Cited

U.S. PATENT DOCUMENTS 2,980,414 A * 4/1961 Perry, Jr. et al. ............ 177/211

3,072,209 A * 1/1963 Perry, Jr. .................... 177/179

(Continued)

FOREIGN PATENT DOCUMENTS

DE 1 531 166 12/1969

(Continued)

*Primary Examiner*—Benjamin C. Lee
(74) *Attorney, Agent, or Firm*—Pendorf & Cutliff

(57) ABSTRACT

The invention relates to a mobile working machine, particularly a mobile concrete pump, comprising a device for monitoring the stability thereof when in operation. The working machine comprises a chassis (10), which contains a supporting structure with two front and two rear support struts (20). The support struts can be extended out of a transporting position and into at least one supporting position and each can be supported on a surface (28) by a telescopic supporting jack or foot (26). The working machine additionally comprises a working boom (14), which can be extended out of a transporting position and into working positions that project beyond the chassis, which can rotate about a vertical axis that is fixed with regard to the chassis, and which is preferably provided in the form of a concrete distributing boom. Measuring devices for determining the respective supporting load are arranged in the area of the supporting foot and their output signals are sent to a stability monitoring device. According to the invention, at least one force sensor (32, 34) is arranged in each supporting jack and is connected in an electrical measuring circuit (36, 38) for outputting a supporting load dependent measurement signal. The monitoring device comprises an evaluation electronic unit (54) which, in predetermined sampling cycles, can be subjected to supporting load measured values and, for their comparison, can be subjected to at least one predetermined stability-determining threshold value.

24 Claims, 4 Drawing Sheets

U.S. PATENT DOCUMENTS

| | | | |
|---|---|---|---|
| 3,277,718 A * | 10/1966 | Ruge | 73/726 |
| 3,680,714 A * | 8/1972 | Holmes | 212/277 |
| 3,712,294 A * | 1/1973 | Muller | 600/595 |
| 3,713,129 A * | 1/1973 | Buchholz | 340/517 |
| 4,135,392 A * | 1/1979 | Young | 73/862.635 |
| 4,546,658 A | 10/1985 | Rocha et al. | |
| 4,833,615 A | 5/1989 | Bitner et al. | |
| 5,214,967 A * | 6/1993 | Grogan | 73/862.542 |
| 5,557,526 A | 9/1996 | Anderson | |
| 5,568,132 A * | 10/1996 | Pratt | 340/657 |
| 5,677,488 A * | 10/1997 | Monahan et al. | 73/593 |
| 5,691,697 A * | 11/1997 | Carvalho et al. | 340/544 |
| 6,170,341 B1 * | 1/2001 | Avitan | 73/862.392 |
| 6,202,013 B1 * | 3/2001 | Anderson et al. | 701/50 |
| 6,555,766 B1 * | 4/2003 | Breed et al. | 177/144 |

FOREIGN PATENT DOCUMENTS

| | | |
|---|---|---|
| DE | 24 36 849 | 2/1976 |
| DE | 29 48 774 A1 | 6/1980 |
| DE | 22 30 546 B2 | 4/1981 |
| DE | 36 05 462 A1 | 8/1987 |
| DE | 38 07 966 C2 | 7/1991 |
| DE | 197 30 436 A1 | 6/1998 |
| DE | 197 16 521 A1 | 10/1998 |
| DE | 198 57 298 A1 | 6/2000 |
| DE | 100 08 514 A1 | 12/2000 |
| EP | 0 531 828 A1 | 8/1992 |
| GB | 1 389 139 | 6/1973 |
| GB | 2 037 444 A | 12/1979 |
| GB | 2 187 432 A | 9/1987 |
| JP | 59106351 | 6/1984 |
| JP | 2001106480 | 4/2001 |

* cited by examiner

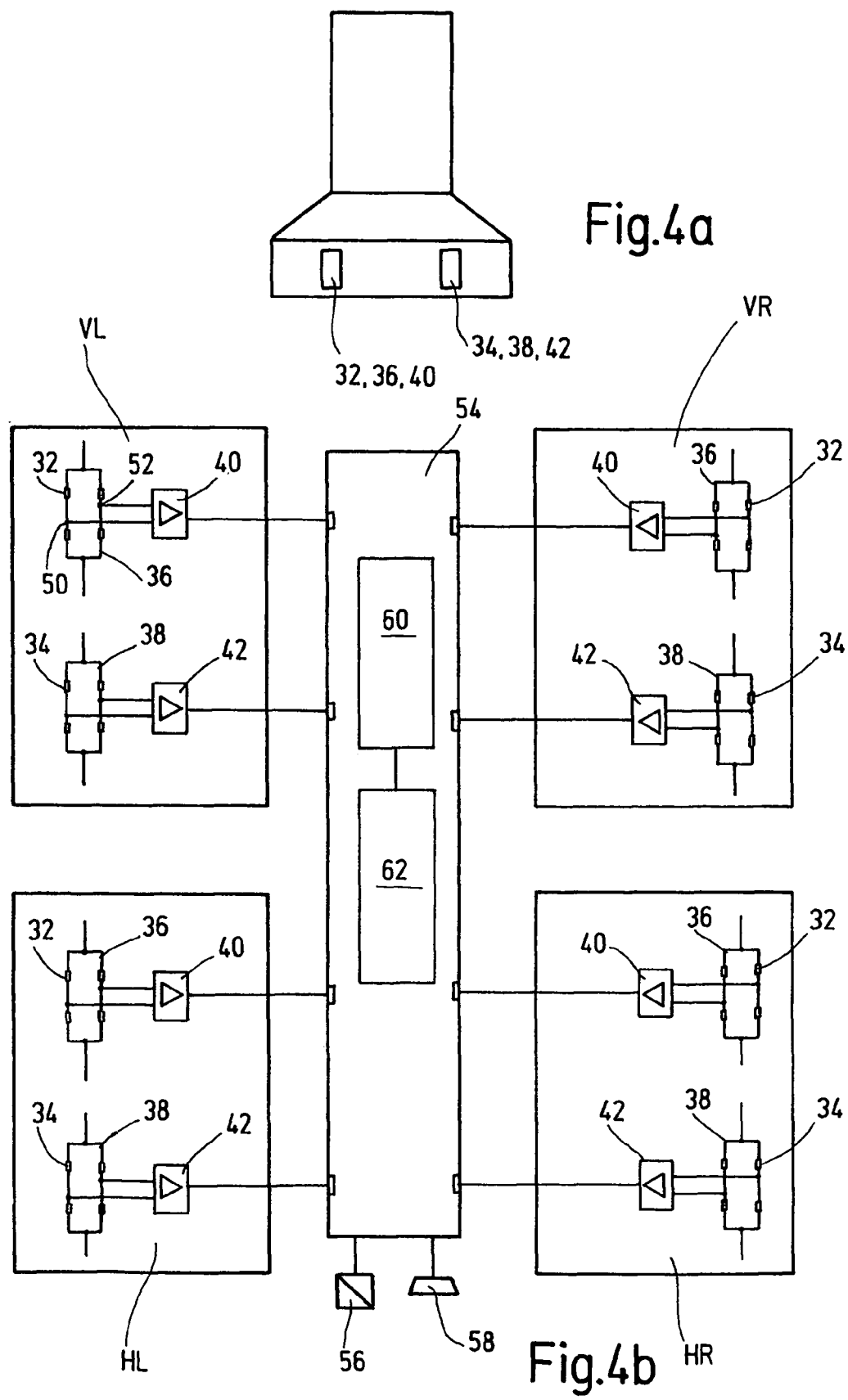

MOBILE WORKING MACHINE PROVIDED WITH STABILITY MONITORING

CROSS REFERENCE TO RELATED APPLICATION

This application is a national stage of PCT/EP02/02053 filed Feb. 27, 2002 and based upon DE 101 10 176.7 filed Mar. 2, 2001 under the International Convention.

BACKGROUND OF THE INVENTION

1. Field of the Invention

The invention concerns a mobile working machine, in particular a mobile concrete pump with a chassis, with two forward and two rearward support struts extendable out from a transport position into at least one supporting position and each preferably supportable upon a surface by a telescopic supporting jack, with a working boom, preferably a concrete distribution boom, which can be extended out of a transport position and into working positions that project beyond the chassis and which can rotate about a vertical axis fixed relative to the chassis, with sensors or measurement devices in the area of the support jacks for determining the respective support load and with a support safety monitoring device receiving the output signals from the sensors or measuring devices.

2. Description of the Related Art

Mobile working machines of this type are provided with extendable support struts, which are intended to enhance the stability of the working device at the location of employment. The support struts have for their part the task of removing the spring-support of the vehicle and to remove the load from the wheels. On the other hand, the support struts are designed to minimize the danger of tipping, which result when high tip moments are produced by the working boom. The support feet of the support struts thereby form the corners of a quadrilateral, of which the side edges define a surface within which the center of gravity of the work device must lie, in order to guarantee a stable stance. Since the projecting work boom is rotatable, the center of gravity describes a full circle during turning, which must lie within the quadrilateral over the work area of the work boom. Since the space in construction sites may be confining, it is often not possible to completely extend the support struts. Thereby the freedom of rotation of the work boom becomes limited. In order to ensure the tip-over safety, safety-monitoring devices have been proposed. Therein pressures existing in the four hydraulic operated telescopes of the support legs are monitored. If the pressure drops off in two support leg cylinders, then the boom movement and the concrete pump are switched off. This technique can also be used in the case that the machine, for space reasons, is not fully supported (periodical BETON June 1996, page 362, 364). Research has however shown that pressure measurements in the telescoping cylinders of the support legs are not sufficient for a reliable monitoring of the support legs. This applies above all when one of the telescoping cylinders rests upon an abutment. Further, dynamic support effects cannot be detected with this monitoring system.

SUMMARY OF THE INVENTION

Beginning therewith, it is the task of the present invention to improve the stance safety monitoring of mobile work devices with respect to their precision and employability in complicated support strut situations.

The solution of this task is proposed in accordance with the combination of characteristics set forth in patent claim 1. Advantageous embodiments and further developments of the invention can be seen from the dependent claims.

The inventive solution is based primarily upon the idea, that at least one force sensor is provided in each support foot, that each force sensor is associated with an electronic measuring circuit for providing a support load dependent measurement signal, and that the monitoring device includes an evaluation electronic, which in predetermined sensing cycles is acted upon with the support foot related support load measurement values and for their comparison with at least one predetermined stability determining threshold value. The inventive arrangement makes possible a real-time monitoring of the support load in the area of the individual support feet in a narrow time frame, such that dynamic effects and carrier or load effects during operation of the work device can be included during monitoring.

It is envisioned in accordance with a preferred embodiment of the invention that the evaluation electronic includes a software routine for the determining of the second lowest support foot related support load measurement value of each work cycle and includes a stability determining threshold value for comparison therewith. Therein consideration is given to the recognition that with consideration of the static indeterminacy of the four-point support, generally a three-point support is employed, which results in changing support configurations during movement of the work boom. One of the support legs can therein even lift off from the substrate, without endangering the tip stability. Determinative for the stance safety is, in accordance with the invention, always the second-lowest support foot related support load measured value. If this falls below a minimal force with declining tendency, then an emergency turning off of the boom movement and the pump operation is indicated. The therefore determinative threshold value provider is set for example to a minimal force of 0.5 to 5% of the support leg related maximal force. The invention makes it possible besides this to emit an advance warning prior to reaching the mentioned danger area. In accordance therewith a further threshold value provider is provided for providing an advance warning force, which lies for example at 5 to 10% of the support leg related maximal load and which signals the pump operator for example via an acoustic and/or optical signal that an elevated degree of caution is necessary. It is basically also possible to use the monitoring device for emergency direct shutting off of the work boom and/or the concrete pump.

In a further preferred embodiment of the invention it is envisioned that in each support foot two preferably identical force sensors are provided, which are provided in measuring circuits independent of each other for providing a support load dependent measurement signals. Therein the evaluation electronic preferably includes a software routine for the pair-wise comparison of the measurement values derived from the support foot related measurement signals with respect to their agreeing or not agreeing. A further processing within the evaluation electronic is possible only when the measurement values associated with the individual support feet are jointly in agreement within a predetermined tolerance range. The redundancy of the measuring system resulting therefrom is necessary in order to ensure a reliable monitoring of the stability of the equipment.

The force sensors preferably include a strain measurement strip or a piezoelectric element. The electrical measurement circuit preferably includes a bridge switch, in which one branch of the associated force sensor is provided and of which the output is connected to an operation amplifier.

Since in stability control the most important thing is a comparison of the measured support load relevant measurement values with predetermined threshold values, it is proposed in accordance with a preferred embodiment of the invention that the electronic measurement circuit is adjusted to an elevated measurement precision in the measurement range which includes the threshold value. Since the stability determining threshold values are to be found primarily at the lower end of the support load scale, it is of advantage, when the electrical measurement circuit includes a measurement precision which increases going from higher to lower support foot related support loads. It has been found to be particularly advantageous when the electrical measurement circuit is adjusted to an elevated measurement precision in a measurement range below 30%, preferably below 15% of the support foot related maximal load.

In order to avoid breaking through the surface of the ground, it can also be necessary in critical ground relationships, to include an upper threshold value. This threshold value is preferably so selected that with a given support surface a ground penetration does not occur.

A further preferred embodiment of the invention envisions that the force sensor is provided on a foot element that can be preferably retrofitted to a support foot. In this case it is also possible that the measurement circuit and in certain cases a part of the evaluation electronic be integrated into this foot element. The measurement circuit is therein preferably coupled via a galvanic or wireless signal transmission path with the evaluation electronic.

BRIEF DESCRIPTION OF THE DRAWINGS

In the following the invention will be described in greater detail on the basis of an illustrative embodiment shown in the figures. There is shown FIG. 1 a view of a mobile concrete pump parked by a street curb with minimally extended support struts on the street side;

FIG. 4a a schematic of a support foot with redundant support load sensors;

FIG. 4b a circuit diagram of the redundant support load sensor with evaluation electronic.

DETAILED DESCRIPTION OF THE INVENTION

Figure 1:
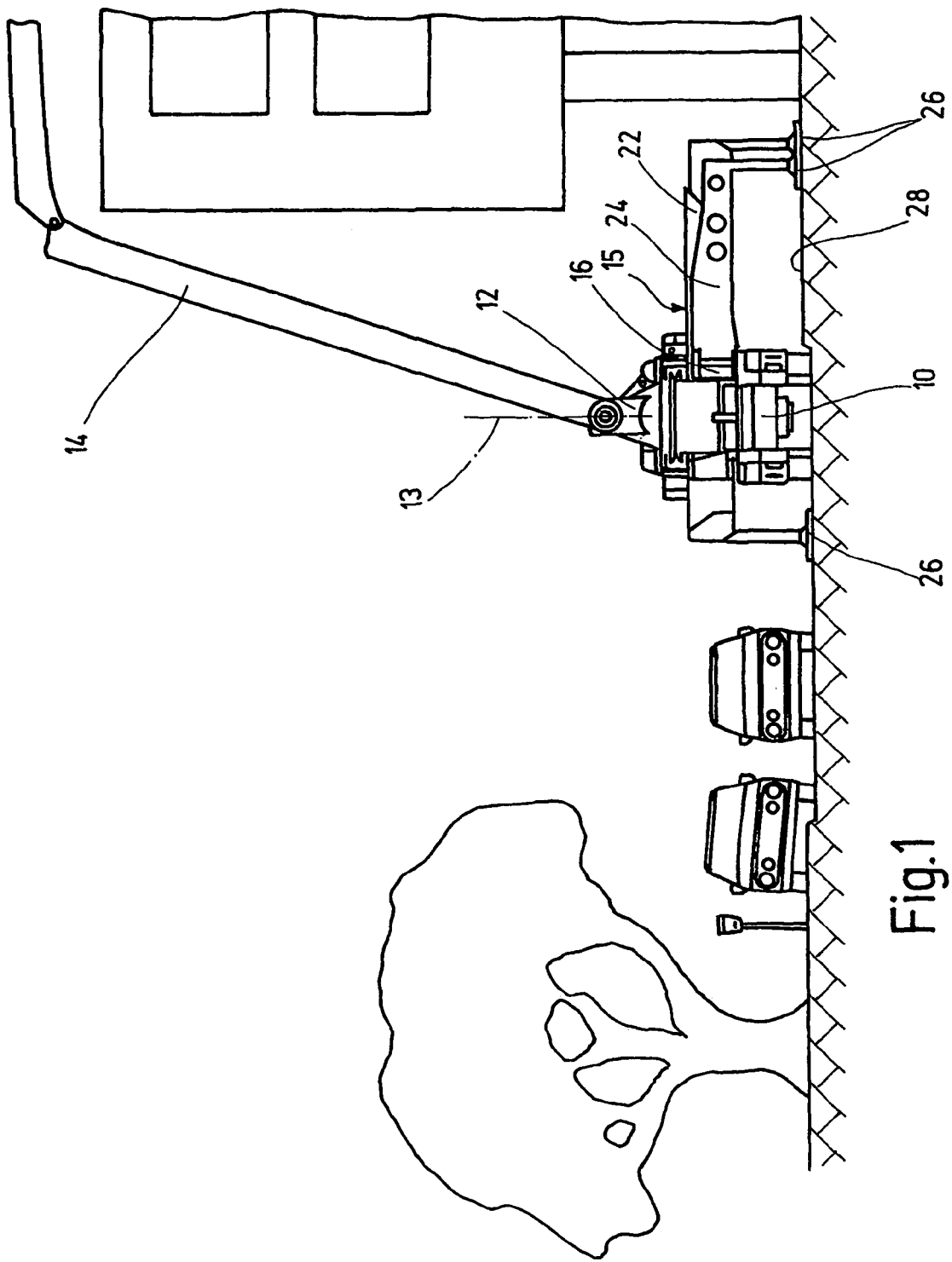
Figure 2A:
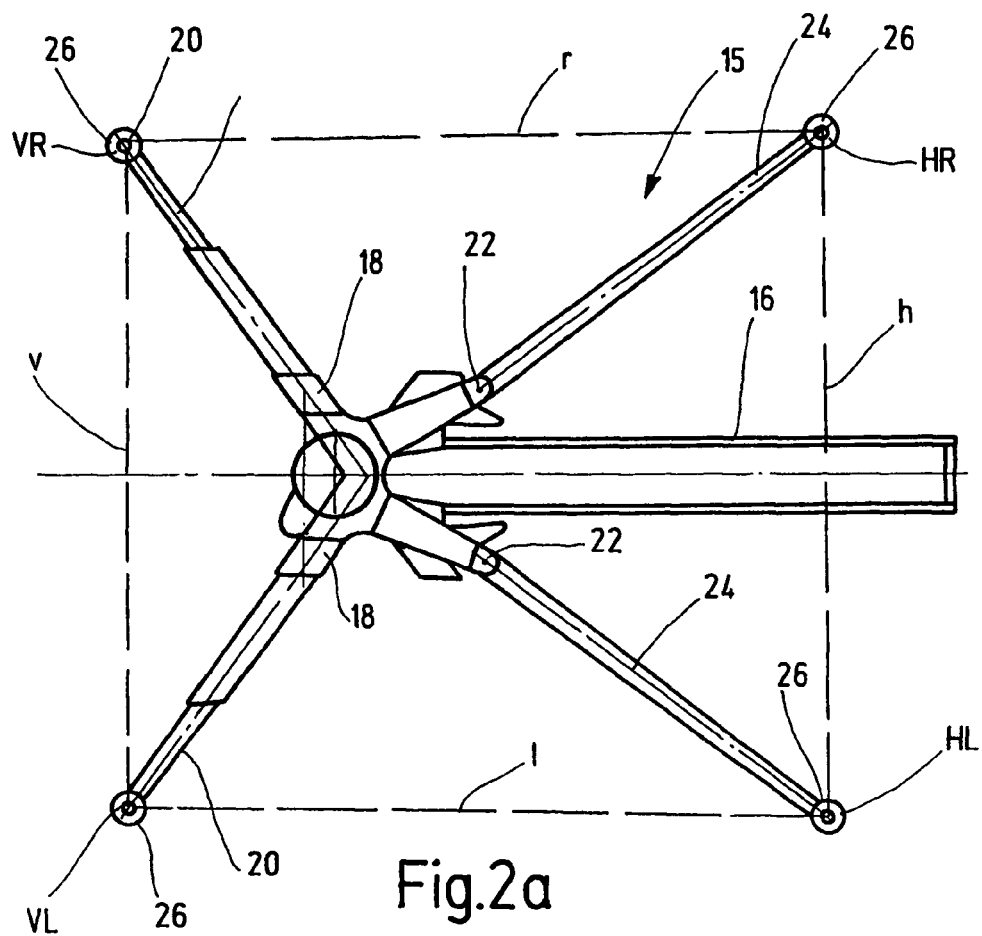
FIGS. 2a and b a top view onto the support arrangement of the mobile concrete pump according to FIG. 1 in the condition of the full supporting and the restricted narrow supporting.
Figure 2B:
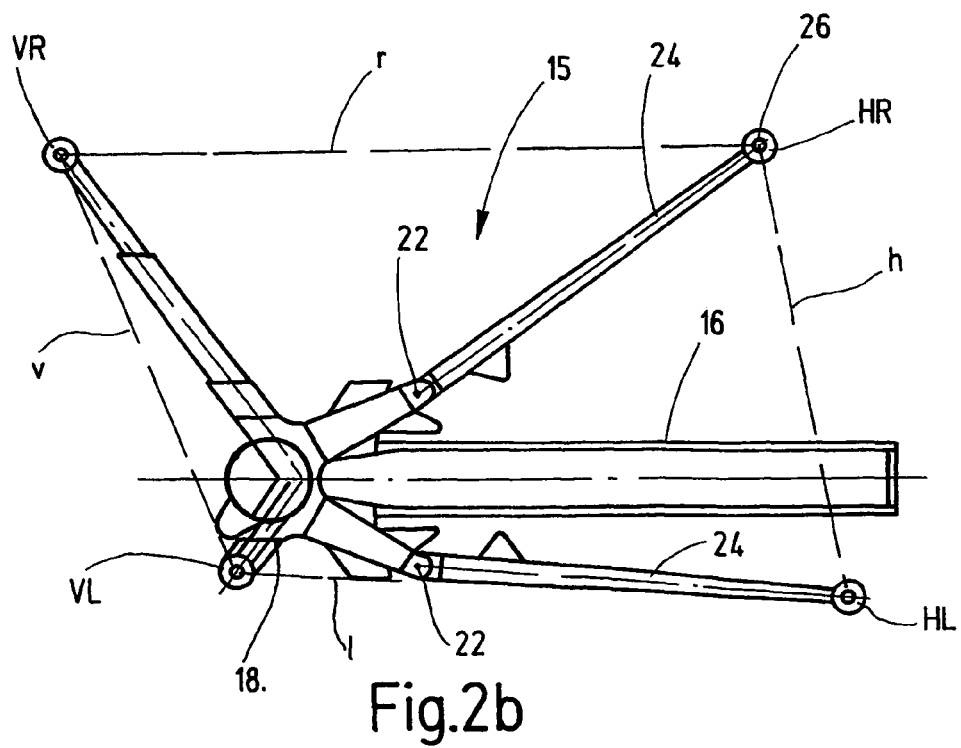

The mobile concrete pump shown in FIG. 1 is comprised essentially of a multi-axle vehicle chassis 10, a boom block 12 located near the forward axle and a concrete distribution boom 14 mounted rotatable about a vehicle chassis fixed vertical axis 13 and a support assembly 15, which includes a vehicle chassis fixed support frame 16, two forward support struts 20 located on the support frame 16 as telescoping segments 18 extendable out of housing tubes into rear support struts 24 pivotable about a perpendicular axis 22. The support struts 20, 24 are supportable upon the ground 28 via respectively one downward extendable support foot 26. The forward and rearward support struts 20, 24 are extendable from a vehicle chassis close-in transport position into a support position via hydraulic means. In the example shown in FIG. 1 a narrow supporting was chosen for the street side. The narrow supporting, wherein the problem of confined space in construction sites has been taken into consideration, leads necessarily to a restriction or narrowing of the rotation angle of the placement boom 14.

The four support feet supported on the ground VL (forward left), VR (forward right), HL (rearward left) and HR (rearward right) define a quadrilateral, of which the sides l, r, v and h (left, right, forward and rearward) respectively define tip-over boundary lines. For ensuring a safe stance, the four boundary lines cannot be exceeded by the center of gravity of the system during outwards extension of the work boom. The invention makes use of the recognition, that the position of the center of gravity within the tip-over quadrilateral can be monitored by support load sensors at the support feet 26 forming the four corners of the tip-over quadrilateral. In accordance therewith a sensor unit 30 is provided in each support foot 26, which includes two force sensors 32, 34 with associated electronic measurement circuitry 36, 38 and operation amplifiers 40, 42. Each measurement circuit 36, 38 provides via its amplifier 40, 42 a measurement signal correlated with the support load sensed in predetermined sampling cycles, which are processed in a central evaluation electronic 54.

Only when the measurement values sensed by the two measurement circuits 36, 38 of one support foot 26 correspond within a predetermined deviation tolerance are they supplied to a subsequent evaluation. In accordance therewith the evaluation electronic 54 includes a software routine 60 for the pair-wise comparison of the measurement values derived from the support foot related measurement signals with respect to their correspondence. When this correspondence is not present in multiple sampling cycles, this indicates a measurement or electronic error, which leads to a emergency turning off of the system and therewith to a placing out of operation of the mobile concrete pump.

A further characteristic of the evaluation electronic 54 is comprised therein, that it includes a software routine 62 for the determination of the second lowest support foot related support load measurement value of each sampling cycle and for the comparison thereof with a stability determining threshold value. Therein consideration is given to the recognition, that a support construction 15 with four support feet 26 is statically over-defined, so that in each constellation of the work boom 14 only three of the four support foot related measurement values are of relevance for the stance stability. The stance stability is basically given when at three support feet 26 a support load still is present, which exceeds the predetermined minimal force. Following the extension of the support struts 20, 24 in the normal case the measured support load in all support feet 26 is greater than a predetermined advance warning force. If the work boom 14 is moved, then one support foot 26 can even completely lift from the ground without risking stability. A warning (acoustic/optic) is only given when the support load in the one of the three other support feet 26 drops below the advance warning force. If the load on the concerned support foot drops further and if its support load drops below a predetermined minimal force, the movement of the work boom 14 and the operation of the concrete pump are switched off by interruption of the hydraulic pressure supply via a emergency off valve 56. In this condition the operator can in an emergency operation, accompanied by an acoustic horn signal, retract the work boom 14 out of the danger area under his own responsibility. An omni-directional light 58 can also be used to pre-warn the operator of the condition. In the manually operated retraction process, the turning off of the omni-directional light 58 indicates that the support load at three support feet 26 has once again exceeded the minimal force.

Figure 3A:
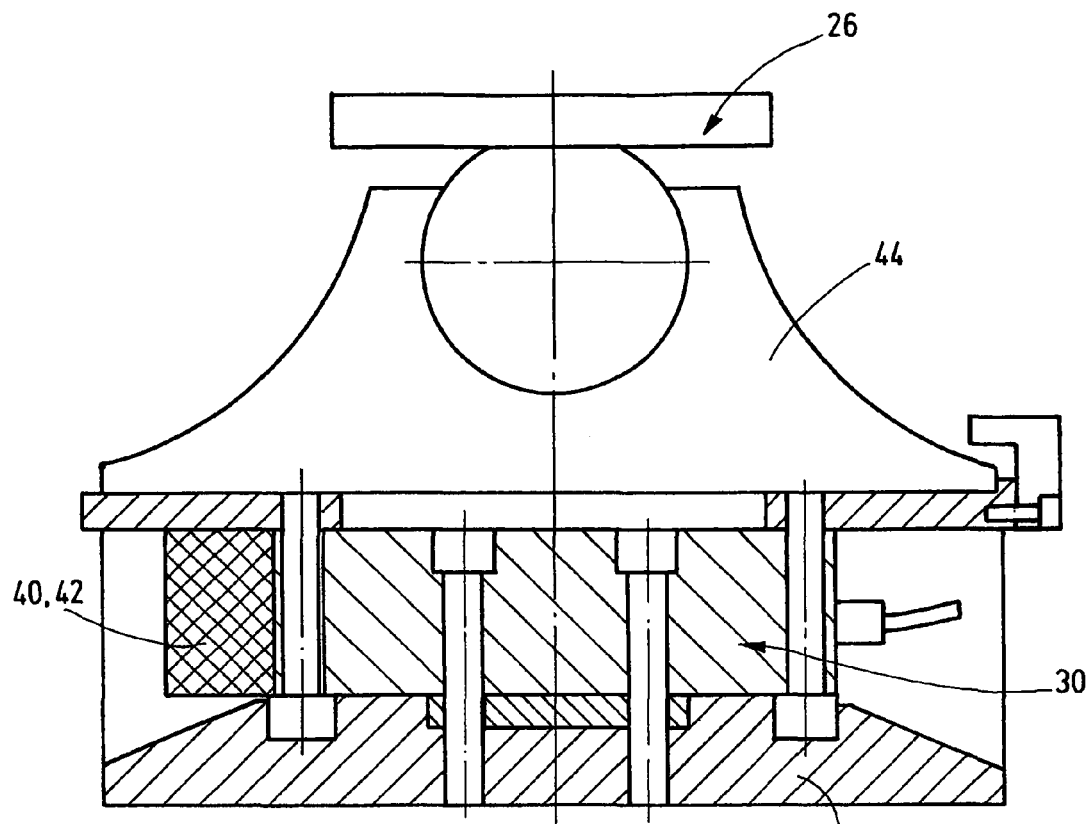
FIG. 3a a side view of a support foot of a support strut with attached support load sensor in sectional representation.
Figure 3B:
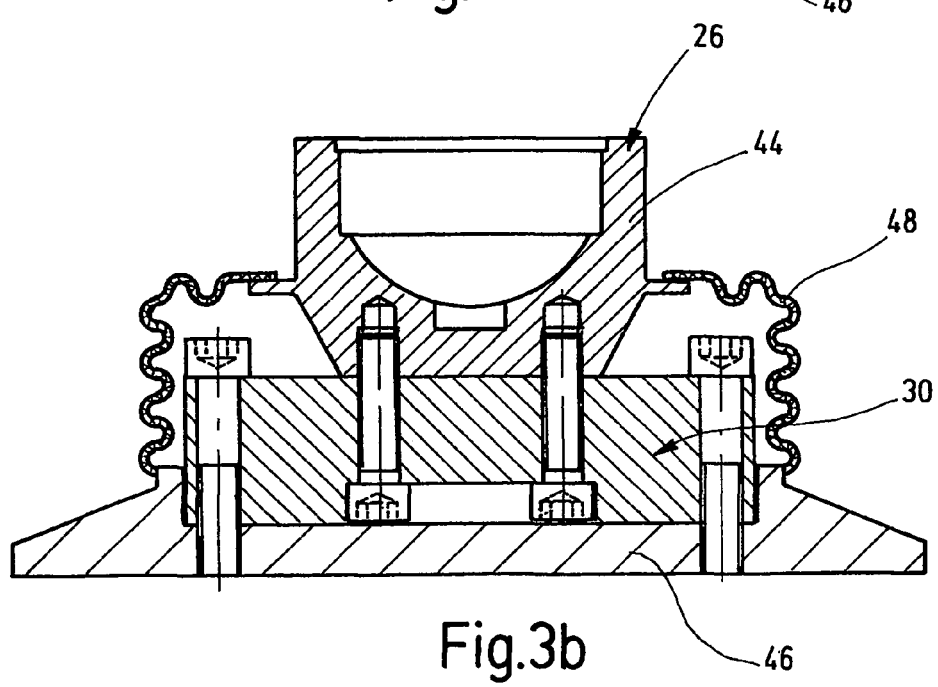
FIG. 3b a section through a support foot of a support strut with integrated support load sensor.

As can be seen from FIGS. 3a and b, the sensor unit 30 is clamped or engaged between a pendulum foot 44 of the support foot 26 and a footplate 46 placeable directly upon the ground. Therein in the case of FIG. 3a the footplate 46 with sensor unit 30 is retrofitted to an already existing pendulum foot 44 of the support foot 26, while in the case of FIG. 3b a pendulum foot 44 with surrounding construction is provided, which replaces the original pendulum foot. The construction according to FIG. 3b is lower than the associated construction according to FIG. 3a and is besides this protected from penetration of dirt and damage from the outside by cover 48.

As can be seen from FIG. 4b, the measurement circuit 36, 38 is a Wheatstone bridge, on one branch of which the force sensor 32 or as the case may be 34, which is a strain measuring strip, is provided. The diagonal pick-offs 50, 52 of the measurement circuits 36, 38 are linked to the inputs of the associated operation amplifiers 40, 42 at the output of which the support load proportional electrical measurement signal can be tapped or read. The measurement range of 4 to 20 mA at the output of the amplifier 40, 42 is used, in order to obtain a high as possible precision with low force values. In accordance therewith the measurement precision is increased by appropriate adjustment of the amplifier in an area, which is approximately 20% of the maximal load occurring at the support foot. With greater support loads the maximal value (for example 20 mA) at the amplifier output is continuously monitored.

It is basically possible to convert the measurement range of the measurement circuit, so that also the maximal load can be measured.

In summary the following can be concluded: The invention relates to a mobile working machine, particularly a mobile concrete pump, comprising a device for monitoring the stability thereof when in operation. The working machine comprises a chassis 10, which contains a supporting structure with two front and two rear support struts 20. The support struts can be extended out of a driving position and into at least one supporting position and each can be supported on a surface 28 by a telescopic supporting jack 26. The working machine additionally comprises a working boom 14, which can be extended out of a driving position and into working positions that project beyond the support struts, which can rotate about a vertical axis that is fixed with regard to the support struts, and which is preferably a concrete distribution boom. Measuring devices for determining the respective supporting load are arranged in the area of the supporting jacks and their output signals are sent to a device for monitoring stability. According to the invention, at least one force sensor 32, 34 is arranged in each supporting jack and is connected in an electrical measuring circuit 36, 38 for outputting a supporting load-dependent measurement signal. The monitoring device comprises an evaluation electronic unit 54 which, in predetermined sampling cycles, can be subjected to the action of supporting load measured values and, for their comparison, can be subjected to the action of at least one predetermined stability-determining threshold value.

What is claimed is:

1. A mobile work device comprising
a vehicle chassis (10),
two forward and two rearward support struts (20) extendable from a transport position to at least one support position and supportable upon the ground (28) with respectively one telescopic support foot (26),
a work boom (14) extendable from a driving position to a work position projecting beyond the vehicle chassis and rotatable about a vehicle chassis-fixed vertical axis (13),
a measurement device (30) provided in the area of the support feet (26) for determining the respective support loads and
a support stability monitoring device responsive to the output signals of the measurement device,
wherein at least one force sensor (32, 34) is provided for each support foot (26), wherein each force sensor is provided in an electrical measurement circuit (36, 38) for output of a support load dependent measurement signal, wherein the monitoring device includes an evaluation electronic (54) which in predetermined sampling cycles evaluates support foot derived support load measurement values for comparison with at least one predetermined stability determining threshold value, and wherein the electrical measuring circuits (36, 38) exhibit a measurement precision which decreases going from low to high support foot derived support load measurement values.

2. A work device according to claim 1, wherein the electrical measuring circuits (36, 38) are adjusted to an increased measurement precision in the measuring range below approximately 30% of the support foot derived maximal load.

3. A work device according to claim 1, wherein the measurement precision of the electrical measurement circuit (36, 38) is selectively reversible.

4. A work device according to claim 1, wherein two force sensors (32, 34) are provided in each support foot (26), which are provided in independent measurement circuits (36, 38) for providing a support load derived measurement signal.

5. A work device according to claim 4, wherein the evaluation electronic (54) includes a software routine (60) for pair-wise comparison with respect to their agreement of the support load measurement values derived from the support load measurement signals.

6. A work device according to claim 1, wherein the evaluation electronic (54) includes a software routine (62) for determining the second lowest support foot related support load measurement value for each sampling cycle and for the comparison thereof with a stability determining threshold value.

7. A work device according to claim 1, wherein the evaluation electronic (54) includes a software routine for determining the highest support foot derived support load measurement value for each sampling cycle and for the comparison thereof with a stability determining threshold value.

8. A work device according to claim 1, wherein the evaluation electronic (54) includes a threshold value provider for predetermining a minimal force.

9. A work device according to claim 1, wherein the evaluation electronic (54) includes a threshold value provider for providing an advance warning force.

10. A work device according to claim 1, wherein the evaluation electronic (54) includes a threshold value provider for providing a maximal force.

11. A work device according to claim 1, wherein the evaluation electronic (54) is connected with a control device (56) for controlling the work boom (14).

12. A work device according to claim 1, wherein the evaluation electronic (54) is connected with a control device (56) for controlling a concrete pump.

13. A work device according to claim 1, wherein the evaluation electronic (54) is connected with an acoustic and/or optical signal provider (58).

14. A work device according to claim 1, wherein the force sensors (32, 34) comprise a strain measuring strip.

15. A work device according to claim 1, wherein the force sensors (32, 34) are piezoelectric sensors.

16. A work device according to claim 1, wherein the electrical measuring circuits (36, 38) include a bridge switch, in one branch of which the associated force sensor (32, 34) is provided.

17. A work device according to claim 16, wherein the measuring circuits (36, 38) include an operation amplifier (40, 42) connected on the input side with diagonal pick-offs (50, 52) from the bridge switch.

18. A work device according to claim 1, wherein the force sensors (32, 34) are provided in a foot element (44, 46) that can be retrofitted securely to the support foot (26).

19. A work device according to claim 18, wherein the at least one measuring circuit (36, 38) is integrated in the associated foot element (44, 46).

20. A work device according to claim 19, wherein the at least one measuring circuit (36, 38) is coupled via a galvanic or wireless transmission path with the evaluation electronic (54).

21. A mobile work device as in claim 1, wherein said mobile work device is a mobile concrete pump, and wherein said a work boom (14) is a concrete distribution boom.

22. A work device according to claim 1, wherein the electrical measuring circuits (36, 38) are adjusted to an increased measurement precision in the measuring range below approximately 15% of the support foot derived maximal load.

23. A mobile work device comprising a vehicle chassis (10), two forward and two rearward support struts (20) extendable from a transport position to at least one support position and supportable upon the ground (28) with respectively one telescopic support foot (26)

a work boom (14) extendable from a driving position to a work position projecting beyond the vehicle chassis and rotatable about a vehicle chassis-fixed vertical axis (13)

a measurement device (30) provided in the area of the support feet (26) for determining the respective support loads and a support stability monitoring device responsive to the output signals of the measurement device, wherein at least one force sensor (32, 34) is provided for each support foot (26), wherein each force sensor is provided in an electrical measurement circuit (36, 38) for output of a support load dependent measurement signal, wherein the monitoring device includes an evaluation electronic (54) which in predetermined sampling cycles evaluates support foot derived support load measurement values for comparison with at least one predetermined stability determining threshold value, and wherein the evaluation electronic (54) includes a software routine (62) for determining the second lowest support foot related support load measurement value for each sampling cycle and for the comparison thereof with a stability determining threshold value.

24. A mobile work device as in claim 23, wherein said mobile work device is a mobile concrete pump, and wherein said a work boom (14) is a concrete distribution boom.

* * * * *